United States Patent [19]

Heidt

[11] 4,316,704
[45] Feb. 23, 1982

[54] FLOATING POWER GENERATION ASSEMBLIES AND METHODS

[76] Inventor: Peter C. Heidt, P.O. Box 163, Masonville, N.J. 08054

[21] Appl. No.: 148,777

[22] Filed: May 12, 1980

Related U.S. Application Data

[63] Continuation of Ser. No. 36,556, May 7, 1979, abandoned, which is a continuation of Ser. No. 857,279, Dec. 5, 1977, abandoned, which is a continuation of Ser. No. 590,960, Jun. 27, 1975, abandoned.

[51] Int. Cl.³ .................. F04F 11/00; F04B 35/00; F03B 13/12
[52] U.S. Cl. .................. 417/100; 417/332; 60/500; 60/501
[58] Field of Search ............ 60/500, 501; 390/42, 390/53; 417/332, 95, 100, 103, 96

[56] References Cited

U.S. PATENT DOCUMENTS

| 816,934 | 4/1906 | Newell | 60/502 |
| 2,385,943 | 10/1945 | Rosenstengel | 60/503 |

Primary Examiner—Richard E. Gluck

[57] ABSTRACT

Floating-on-a-body-of-water compressed-air-generating assemblies and methods are disclosed which are utilized to drive electrical generators powered by compressed air. The integrated assembly utilizes windmills, reciprocating float-linkage means, collapsible paddle blades, and at least one member selected from the water-motion-actuated group consisting of slosh boxes, sliding masses, rack-and-pinions, and combinations thereof.

1 Claim, 10 Drawing Figures

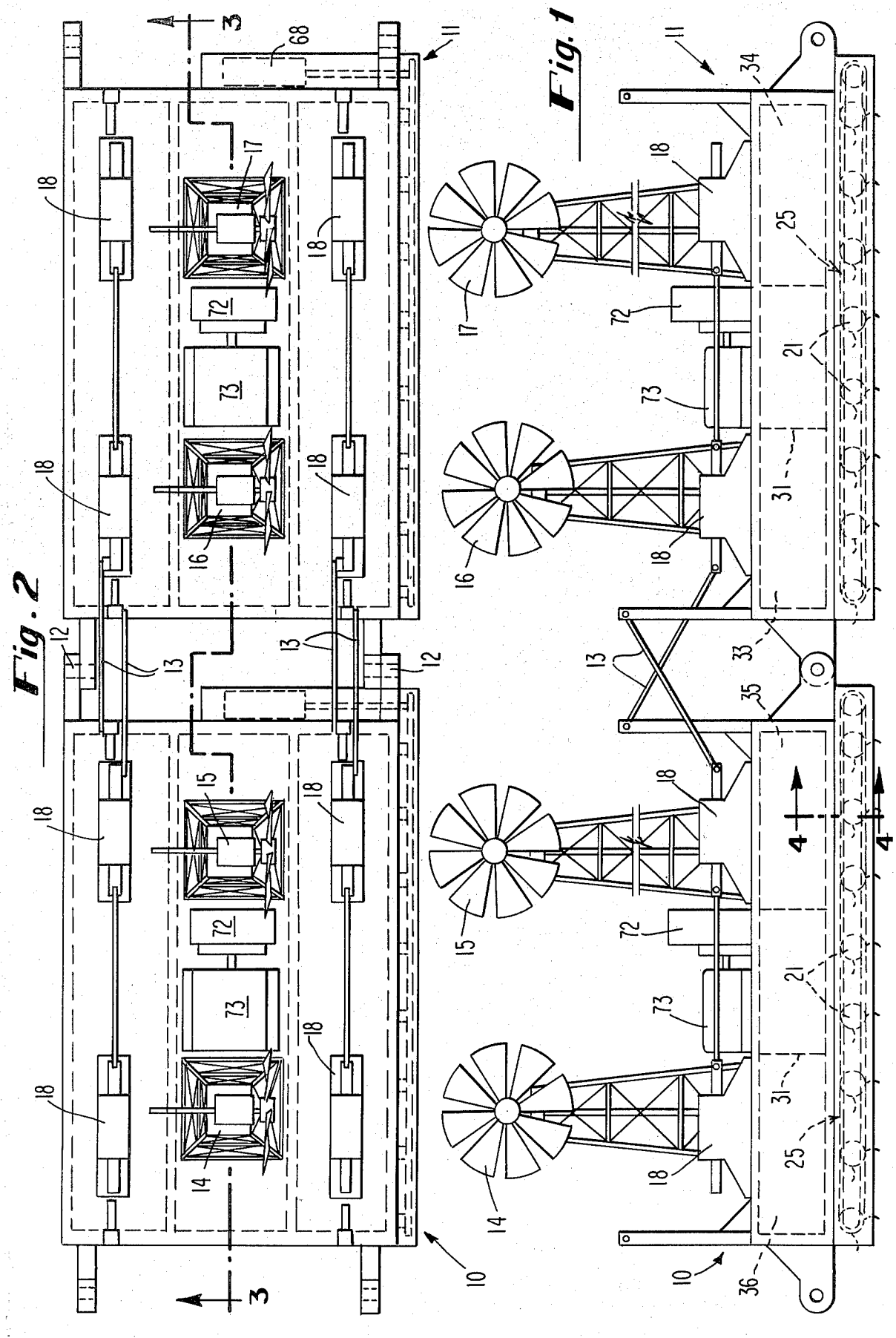

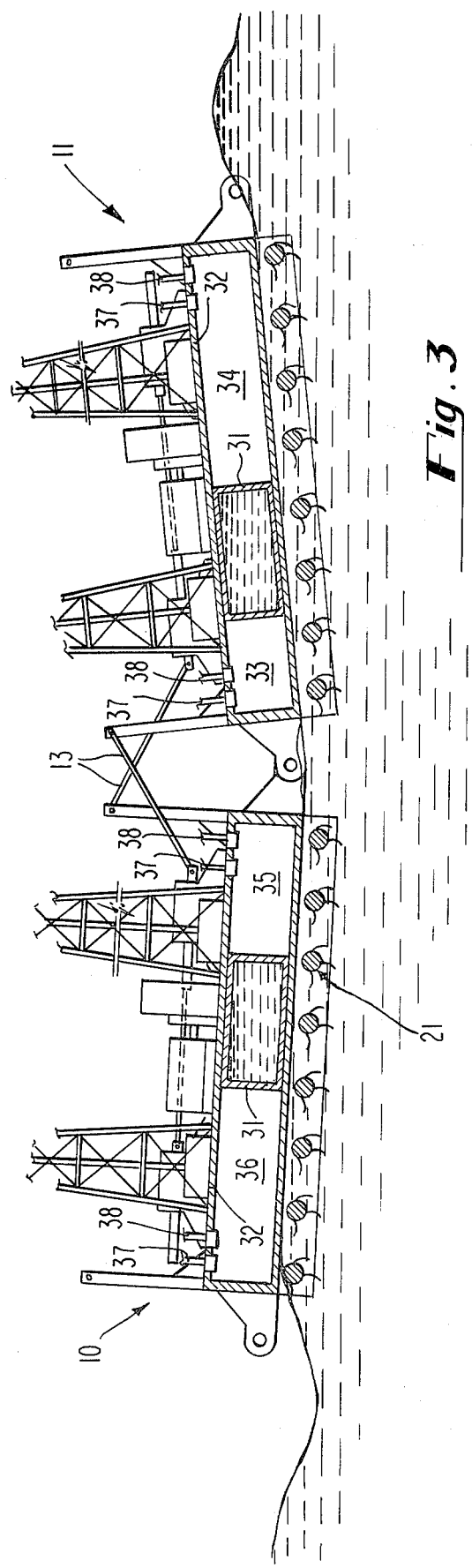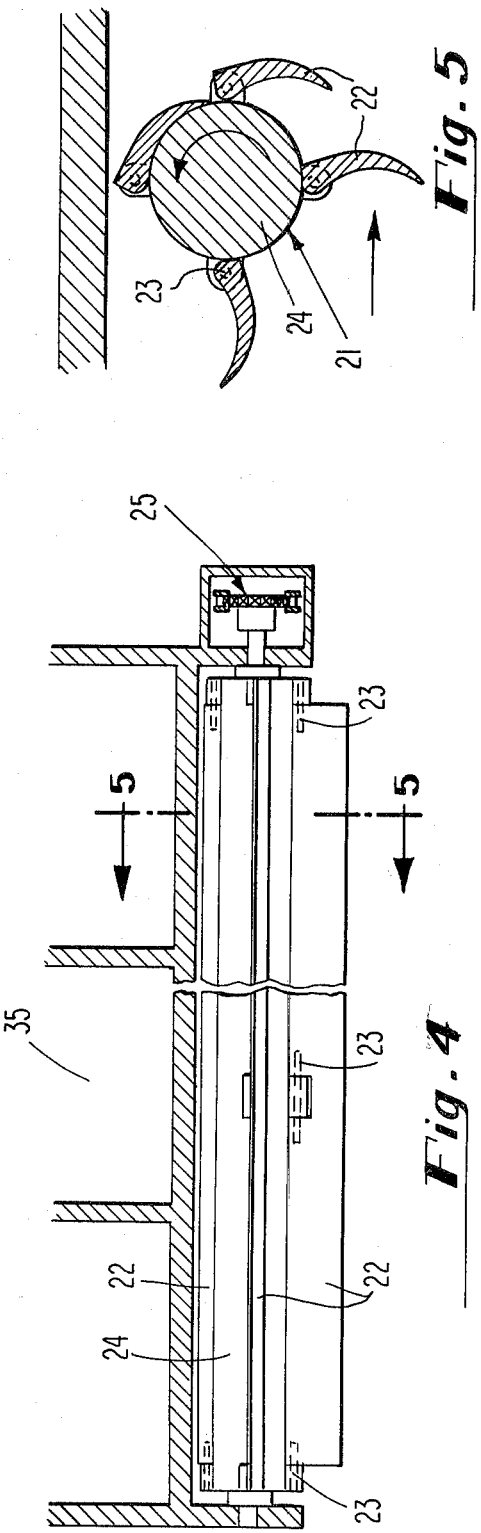

FLOATING POWER GENERATION ASSEMBLIES AND METHODS

This is a continuation of application Ser. No. 36,556, filed May 7, 1979, now abandoned, which is a continuation of application Ser. No. 857,279, filed Dec. 5, 1977, now abandoned, which is a continuation of application Ser. No. 590,960, filed June 27, 1975, now abandoned.

BACKGROUND OF THE INVENTION

This invention relates to the harnessing of the water motion of oceans, seas, and lakes; and more particularly to a floating platform which utilizes the water motion to compress air which is used to drive an electrical generator.

As the ready availability of energy resources dwindles, it becomes increasingly necessary to discover ways and means by which hitherto unavailable energy resources can be tapped and utilized. It has long been desired to utilize the motion of the water in oceans, seas, and lakes to somehow generate or transform energy into a utilizable form. See, for instance, U.S. Pat. Nos. 3,664,125; 3,746,875; 3,697,764; 3,664,125; 3,567,953; 3,515,889; 3,487,228; 2,855,851; 2,484,183; 1,763,191; 1,396,580; 1,393,472; 1,324,335; 1,008,683; 738,996; and 603,314.

Previous ways and means to harness the power of the ocean have tended to concentrate on the utilization of only one method per device. Since the extraction of any energy from the ocean in inherently inefficient, reliance upon only one method of extraction per device or assembly increases the probability of the entire operation being economically unfeasible.

SUMMARY OF THE INVENTION

Accordingly, it is among the objects of this invention to provide assemblies and methods for generating power from the water-motion of bodies of water which is economically more efficient than hitherto known devices, assemblies, and methods.

This and other objects of the invention are obtained with assemblies and methods for utilizing the water motion of large bodies of water to compress air which is used to drive electrical generators.

The complete floating-on-a-body-of-water compressed-air-generating assembly comprises in combination at least one windmill, at least one reciprocating float-linkage means, at least one collapsible-paddle-blade assembly, and at least one member selected from the group consisting of a water-motion-actuated slosh box, a water-motion-actuated sliding mass, a water-motion-actuated rack-and-pinion, and combinations thereof.

The reciprocating float-linkage means comprises at least two floating platforms (floats), and reciprocating linkage means connecting the two floats. The reciprocating linkage means is adapted to compress air as the means reciprocate due to the motion of the water tending to separate and bring together the two floats.

The collapsible-paddle-blade assembly comprises at least one paddle wheel mounted beneath the float, which is adapted to rotate in water current. Each paddle blade is pivotally collapsible so as to reduce fluid drag when moving in a current-opposing direction for half of its cycle.

The water-motion-actuated slosh box comprises a hollow container partially occupied with water; an air-inlet and air-outlet check valve at each of at least two opposite ends of the hollow container; baffles within the hollow container positioned so as to hinder entry of water into the check valves. The motion of the slosh box, due to motion of the body of water, sloshes the water within the hollow container to and fro, thus tending to compress air within the hollow container and to expel the compressed air through the outlet check valve; and to intake replacement air through the intake check valve.

The water-motion-actuated sliding mass comprises a hollow chamber; a mass within the chamber which is in a sliding air-tight contact with the interior walls of the chamber such as to have the mass divide the chamber into two portions; an air-inlet and air-outlet check valve at each of the two opposite ends of the hollow chamber. The motion of the hollow chamber due to the motion of the body of water causes the mass to slide to and fro within the chamber, thus tending to compress air within that portion of the chamber toward which the mass is sliding, and tending to expel the compressed air through the outlet check valve, and to intake replacement air through the intake check valve, at the other end of the chamber.

The rack-and-pinion comprises a hollow container partially occupied with water, a cam surface within the hollow container floating upon the water within the hollow container, a cam-follower in contact with the cam surface, a rack-and-pinion connected to said cam-follower, said pinion driving an air compressor. The motion of the hollow container, due to the motion of the body of water, causes the surface of said water within said hollow container to rise and fall, thus varying the position of said cam surface, and in turn the cam-follower, which drives the rack-and-pinion.

BRIEF DESCRIPTION OF THE DRAWINGS

FIG. 1 is a side view of an integrated device according to the present invention, being two floating platforms connected by linkage means;

FIG. 2 is a top view of the assembly shown in FIG. 1;

FIG. 3 is a cross-section taken along the lines 3—3 shown in FIG. 2, the integrated assembly being shown in position on a body of water in the presence of a disturbed wave motion, the sliding masses being shown within the floats;

FIG. 4 is a foreshortened front view of one of the collapsible-paddle-blade assemblies of the present invention, taken along the lines 4—4 of FIG. 1;

FIG. 5 is a cross-section of the collapsible-paddle-blade assembly, taken along the lines 5—5 of FIG. 4;

DESCRIPTION OF THE PREFERRED EMBODIMENTS

Referring to the figures, FIG. 1 depicts the side view of an integrated assembly according to the present invention. Two floats (floating platforms) 10 and 11 are joined together by pivot means 12 and reciprocating float-linkage means 13. Four windmills 14, 15, 16, and 17 are shown. Windmills 15 and 17 are shown. Windmills 15 and 17 are shown foreshortened, since in the actual embodiment, they would be taller than windmills 14 and 16, so that the windmill blades of 15 and 17 would be up beyond the wake of wind streaming past windmills 14 and 16, so as to assure full power flow to all windmills.

Figure 10:
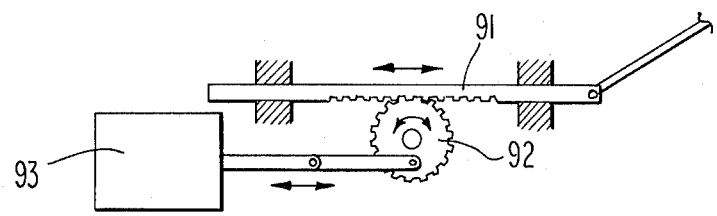
FIG. 10 depicts the means by which the reciprocating float-linkage means of the present invention compresses air, the linkage means being shown driving a rack-and-pinion which in turn drives a compressing ram.

As shown more clearly in FIG. 10, reciprocating float-linkage means 13 operate a rack-and-pinion, which are housed inside housings 18 driving rams which compress air. As shown in FIG. 3, it is the rocking motion of waves or swells which tend to separate and bring together the two floats 10 and 11 about pivot 12.

FIGS. 3, 4 and 5 show in more detail the collapsible-paddle-blade assemblies 21 of the present invention. FIG. 3 shows the paddle blade assemblies in operation mounted beneath floats 10 and 11; FIG. 4 shows a foreshortened front view of the paddle blades, and FIG. 5 shows an enlarged cross section of the paddle blades. Blade elements 22 are pivotably hinged at hinge 23 of each paddle blade so as to be collapsible against the center 24 of the paddle blade assembly on the back-stroke of the paddle blade, so as to reduce fluid drag when the paddle blade is being pushed by the center element 24 in the direction opposing the current, shown in FIG. 5 by the arrow. All of the paddle blade assemblies are linked together by a chain 25 which drives an air compressor.

The center of the floats will have at least one member selected from the group consisting of a water-motion-actuated slosh box, a water-motion-actuated sliding mass, a water-motion-actuated rack-and-pinion, or combinations thereof. FIG. 3 depicts the water-motion-actuated sliding mass of the present invention. Mass 31, in this instance filled with water, slides within hollow chamber 32. Mass 31 is in sliding, air-tight contact with the interior walls of chamber 32, the mass serving to divide chamber 32 into fore and aft portions. As shown in FIG. 3, for float 11 sliding mass 31 divides hollow chamber 32 into forward portion 33 toward which mass 31 is sliding and aft portion 34 from which mass 31 is sliding. In float 10, sliding mass 31 divides chamber 32 into forward portion 35 towards which mass 31 is sliding and aft portion 36 which from mass 31 is sliding.

Portions 33, 34, 35, and 36 all have both an air-inlet check valve 37 and an air-outlet check valve 38. Thus, in float 10, as mass 31 is sliding from chamber 36 to chamber 35, air being compressed within chamber 35 is being expelled through air-outlet check valve 38, while in chamber 36 air is being taken in through air-intake check valve 37. Likewise in chamber 11, as sliding mass 31 slides toward portion 33 and away from portion 34, the air being compressed within chamber 33 is being forced outward through air-outlet check valve 38 in portion 33, while air is being taken into chamber 34 through air-intake check valve 37.

Figure 6:
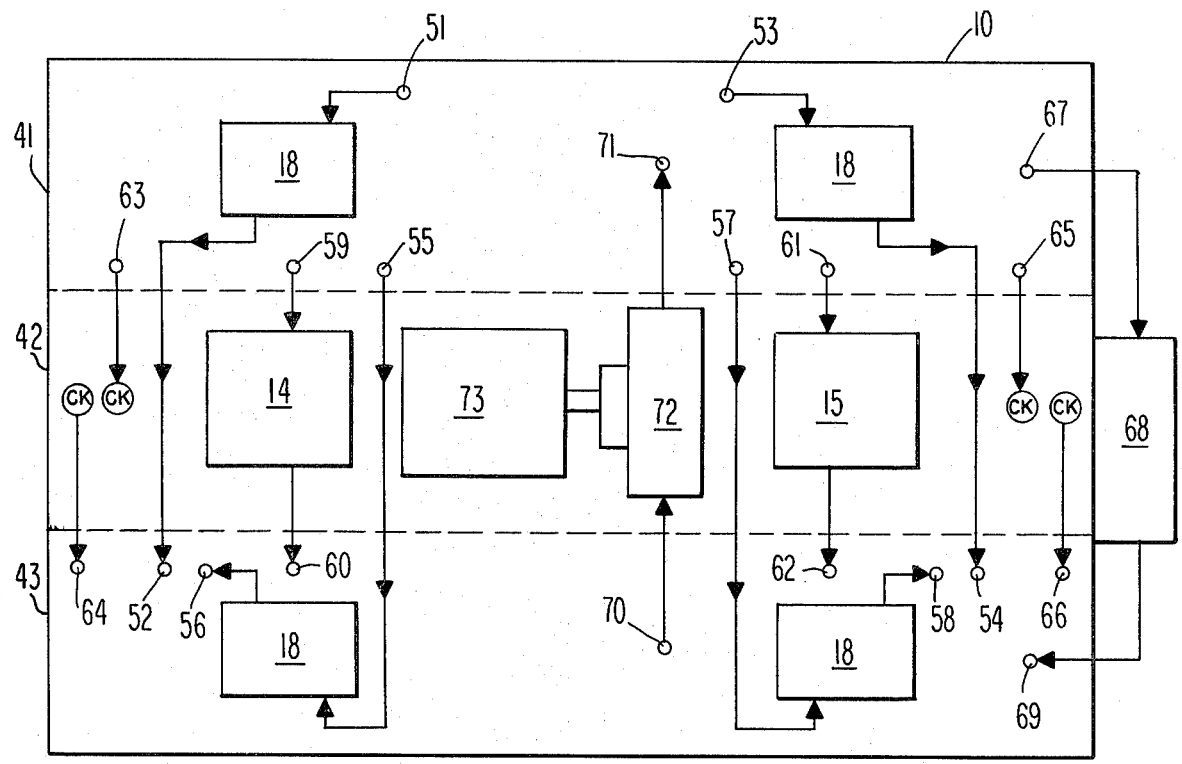
FIG. 6 is a flow diagram of the compressed air on an assembly according to the present invention.

FIG. 6 is a flow diagram of the compressed air flow on a typical float according to the present invention. As shown in FIG. 6, float 10 (and float 11) has its under portion divided into three longitudinal sections, section 41, 42, and 43. Section 41 is a supply air tank having unpressurized air. Section 42 is a middle section which is adapted to have within it at least one member selected from the group consisting of a water-motion-actuated slosh box, a water-motion-actuated sliding mass, a water-motion-actuated rank-and-pinion, and combinations thereof. Section 43 is a compressed air tank, into which the air compressed by the various energy-transformation devices on the top of float 10 is stored.

As shown in FIG. 6, unpressurized supply air from supply tank 41 is taken from points 51, 53, 55, and 57 for use in the reciprocating float-linkage means 18, from which after being compressed, the compressed air is introduced into compressed air tank 43 at points 52, 56, 54, and 58. Supply air is taken from supply air tank 41 at points 59, and 61, for use in windmills 14 and 15, respectively, and the air compressed by the windmills is then introduced into compressed air storage tank 43 at points 60 and 62. The various collapsible-paddle-blade assemblies 21 which drive a chainbelt 25 which operates an air compressor 68, appear in FIG. 6. Supply air is taken from supply air tank 41 at point 67 and supplied to air compressor 68 which then introduces the compressed air into a compressed air tank 43 at point 69.

Compressed air is extracted from compressed air tank 43 at point 70 and supplied to compressed air fluid pump 72 which drives electrical generator 73. The exhaust from compressed air pump 72 is introduced into supply air tank 41 at point 71. Thus, all of the various energy-transformation devices on float 10 operate to compress air which is then used to drive a pump which operates an electrical generator.

Figure 7:
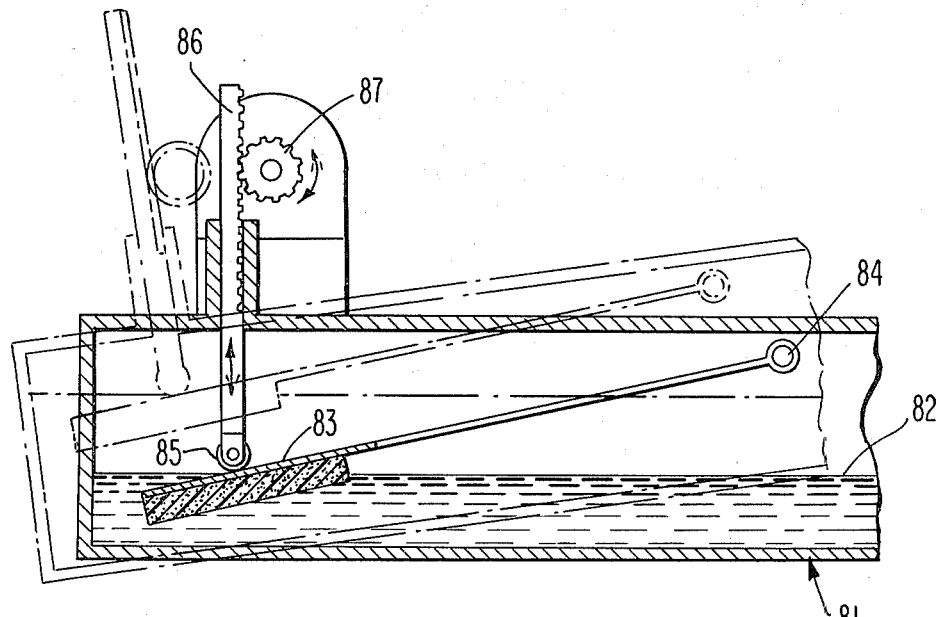
FIG. 7 depicts the water-motion-actuated rack-and-pinion of the present invention, a disturbed position being shown in dot-lines.

FIG. 7. depicts the water-motion-actuated rack-and-pinion of the present invention. Hollow container 81 would be positioned within the middle portion 42 of float 10 (or 11). Hollow container 81 is partially filled with water having an upper free surface 82. Cam surface 83 floats upon water surface 82; cam surface 83 being pivoted at a point 84. Cam follower 85 is in contact with cam surface 83 and as cam surface 83 rises and falls due to the rising and falling of water surface 82 due to motion of the body of water upon which float 10 floats, cam follower 85 pushes rack 86 upwards and downwards; as shown by the alternative position shown in FIG. 7 by the dash-dot lines. Rack 86 drives pinion 87 which in turn operates an air compressor. Thus, the motion of the body of water causes the cam surface to move up and down thus moving the cam follower up and down thus moving the rack up and down thus moving the pinion around to drive an air compressor, thus compressing air, which is used in turn to drive electrical generator 73.

FIG. 10 illustrates the manner in which the reciprocating float-linkage means 18 operates a rank 91 which drives a pinion 92 which operates a ram 93 which compresses air.

Figure 8:
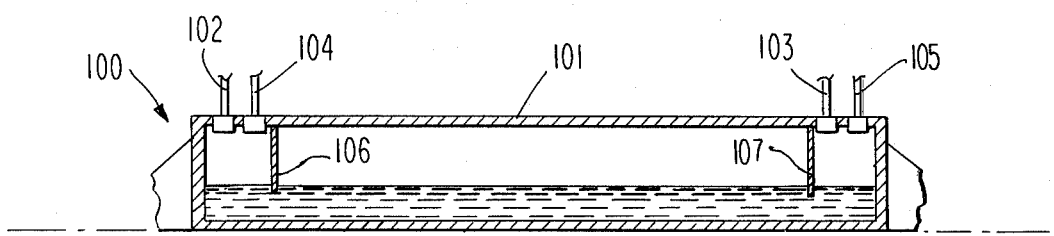
FIG. 8 depicts the water-motion-actuated slosh box of the present invention in a quiescent state.
Figure 9:
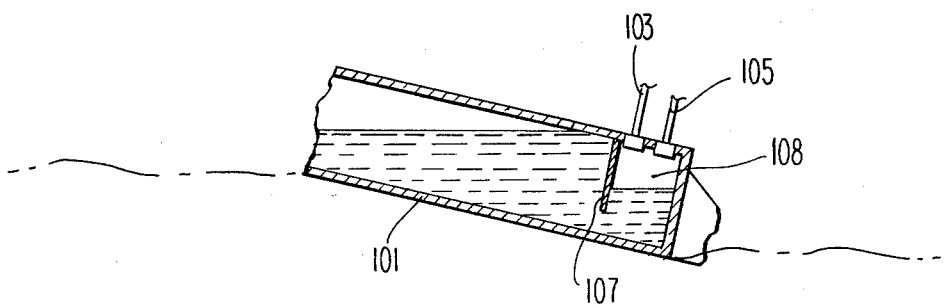
FIG. 9 depicts the water-motion-actuated slosh box of the present invention in a disturbed state.

FIGS. 8 and 9 depict the water-motion-actuated slosh box of the present invention. The slosh box would be positioned within middle section 42 of float 10 (or 11).

Slosh box 100 comprises a hollow container 101 partially filled with water. At either end of the slosh box are air-inlet check valves 102 and 103 and air-outlet check valves 104 and 105. Baffles 106 and 107 are also positioned at opposite ends of slosh box 100. As slosh box 100 undergoes motion due to motion of the body of water upon which float 10 is positioned, the water within the slosh box sloshes back and forth to and fro within hollow container 101 of slosh box 100. As shown in FIG. 9, as the water sloshes toward the end of slosh box 100 wherein are positioned check valves 103 and 105, baffle 107 tends to prevent the advancing wall of water from blocking check valves 103 and 105. The wall of advancing water tends to compress the air within space 108. The compressed air within space 108 exits container 101 through air-outlet check valve 105, from which it is taken to compressed air storage tank 43. When the process is reversed and the wall of water advances toward the end of container 101 wherein are positioned check valves 102 and 104, then replacement air is introduced into space 108 from supply air tank 41 through intake valve 103. Thus, in this manner the sloshing back and forth of the water within the slosh box tends to compress air.

It will be apparent from the above disclosure that various other modifications may be made in the details of construction, use, and operation of the invention, and yet still be within the spirit and scope of the present invention as defined in the following claims.

What is claimed is:

1. A prime mover comprising in combination
 (1) a pair of floats,
 (2) articulating means connecting each float of the pair to the other;
 (3) linkage means fixedly mounted upon each float of the pair and adapted to do useful work upon the relative displacement of either float about said articulating means;
 (4) a central longitudinal hollow chamber formed within each float coextensive therewith, said chamber being filled partially with a body of liquid having a free surface coextensive with the chamber;
 (5) at least two longitudinal air tanks formed within each float coextensive therewith and spaced apart by said central chamber, whereby upon displacement of one end of a float the liquid contained in the central hollow chamber moves to the opposite end of the float, thereby accumulating energy proportional to the displacement.

* * * * *